United States Patent
Takae et al.

(10) Patent No.: US 7,305,077 B2
(45) Date of Patent: Dec. 4, 2007

(54) TELEPHONE DIRECTORY INFORMATION MODIFYING APPARATUS

(75) Inventors: Naohito Takae, Kawasaki (JP); Junji Sakai, Hokkaido (JP); Mamoru Mitsuhashi, Aomori (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 09/769,531

(22) Filed: Jan. 26, 2001

(65) Prior Publication Data

US 2002/0018547 A1 Feb. 14, 2002

(30) Foreign Application Priority Data

Aug. 11, 2000 (JP) ............................. 2000-243669

(51) Int. Cl.
*H04M 3/42* (2006.01)
(52) U.S. Cl. ..................... 379/201.12; 379/207.02; 455/414.1; 709/245
(58) Field of Classification Search ............ 379/93.23, 379/355.02, 218.01, 355.06, 201.02, 201.12, 379/207.02; 455/414.1, 414, 418; 709/245
See application file for complete search history.

(56) References Cited

U.S. PATENT DOCUMENTS

| | | | |
|---|---|---|---|
| 5,483,586 A | 1/1996 | Sussman | 379/201 |
| 6,018,568 A | 1/2000 | Furman et al. | 379/93.15 |
| 6,289,091 B1 * | 9/2001 | Lautenschlager et al. | 379/207.02 |
| 6,317,593 B1 * | 11/2001 | Vossler | 455/414.1 |

FOREIGN PATENT DOCUMENTS

| | | |
|---|---|---|
| EP | 0 766442 A1 | 4/1997 |
| JP | 01-175351 | 7/1989 |
| JP | 05-347665 | 12/1993 |
| JP | 08-182052 | 7/1996 |
| JP | 08-228383 | 9/1996 |
| JP | 09284379 A | 10/1997 |
| JP | 411331353 * | 11/1999 |
| JP | 2000278393 A * | 10/2000 |
| JP | 2001245050 * | 9/2001 |
| WO | WO99/55058 | 10/1999 |

OTHER PUBLICATIONS

Office Action for corresponding Japanese Application No. 2000-243669 dated Jun. 7, 2005.

* cited by examiner

*Primary Examiner*—Gerald Gauthier
(74) *Attorney, Agent, or Firm*—Staas & Halsey LLP

(57) ABSTRACT

A telephone directory information modifying apparatus which makes use of backup data, which is a backup of telephone directory information of portable telephones and held at a data center, to permit mutual operation accompanying telephone number change. On receiving a telephone number change notification instruction, changer telephone directory information retrieving means retrieves telephone directory information of a changer from the backup data, registrant information extracting means extracts information about registrants registered in the telephone directory, registrant telephone directory information retrieving means acquires registrants' telephone directory information from the backup data, telephone number change recipient extracting means extracts registrants who have registered the changer in their telephone directory information, telephone number changing means rewrites the changer's telephone number in the extracted registrants' telephone directory information, and change notifying means transmits telephone number change notification mail to the registrants.

9 Claims, 16 Drawing Sheets

| CONTRACTOR'S TELEPHONE NO. | CONTRACTOR'S NAME |
|---|---|
| 090-AAAA-BBBB | SUZUKI TARO |
| TELEPHONE DIRECTORY INFORMATION ||
| TELEPHONE NO. | NAME |
| 090-AAAA-CCCC | YAMADA HANAKO |
| 090-AAAA-DDDD | SAITO AKEMI |
| 090-BBBB-AAAA | SASAKI JIRO |
| . | |
| . | |
| . | |

FIG. 3

BEFORE CHANGE

| CONTRACTOR'S TELEPHONE NO. | CONTRACTOR'S NAME |
|---|---|
| 090-AAAA-CCCC | YAMADA HANAKO |
| TELEPHONE DIRECTORY INFORMATION ||
| TELEPHONE NO. | NAME |
| 090-AAAA-BBBB | SUZUKI TARO |
| 090-AAAA-DDDD | SAITO AKEMI |
| 090-BBBB-AAAA | SASAKI JIRO |
| . | |
| . | |
| . | |

FIG. 7(A)

AFTER CHANGE

| CONTRACTOR'S TELEPHONE NO. | CONTRACTOR'S NAME |
|---|---|
| 090-AAAA-CCCC | YAMADA HANAKO |
| TELEPHONE DIRECTORY INFORMATION ||
| TELEPHONE NO. | NAME |
| 090-YYYY-ZZZZ | SUZUKI TARO |
| 090-AAAA-DDDD | SAITO AKEMI |
| 090-BBBB-AAAA | SASAKI JIRO |
| . | |
| . | |
| . | |

FIG. 7(B)

CHANGER

| CONTRACTOR'S TELEPHONE NO. | CONTRACTOR'S NAME |
|---|---|
| 090—AAAA—BBBB | SUZUKI TARO |
| TELEPHONE DIRECTORY INFORMATION ||
| TELEPHONE NO. | NAME |
| 090—BBBB—AAAA | SASAKI JIRO |
| 090—AAAA—CCCC | YAMADA HANAKO |
| 090—AAAA—DDDD | SAITO AKEMI |
| . | |
| . | |
| . | |

FIG. 8(A)

REGISTRANT

| CONTRACTOR'S TELEPHONE NO. | CONTRACTOR'S NAME |
|---|---|
| 090—BBBB—AAAA | SASAKI JIRO |
| TELEPHONE DIRECTORY INFORMATION ||
| TELEPHONE NO. | NAME |
| 090—AAAA—CCCC | YAMADA HANAKO |
| 090—AAAA—DDDD | SAITO AKEMI |
| 090—BBBB—DDDD | SATO SABURO |
| . | |
| . | |
| . | |

FIG. 8(B)

| CONTRACTOR'S TELEPHONE NO. | CONTRACTOR'S NAME | CONTRACTOR'S TELEPHONE NO. | CONTRACTOR'S NAME | CONTRACTOR'S TELEPHONE NO. | CONTRACTOR'S NAME |
|---|---|---|---|---|---|
| 090-AAAA-CCCC | YAMADA HANAKO | 090-AAAA-DDDD | SAITO AKEMI | 090-BBBB-AAAA | SASAKI JIRO |
| TELEPHONE DIRECTORY INFORMATION | | TELEPHONE DIRECTORY INFORMATION | | TELEPHONE DIRECTORY INFORMATION | |
| TELEPHONE NO. | NAME | TELEPHONE NO. | NAME | TELEPHONE NO. | NAME |
| 090-AAAA-BBBB | SUZUKI TARO | 090-AAAA-CCCC | YAMADA HANAKO | 090-AAAA-CCCC | YAMADA HANAKO |
| 090-AAAA-DDDD | SAITO AKEMI | 090-AAAA-BBBB | SUZUKI TARO | 090-AAAA-BBBB | SUZUKI TARO |
| . | | . | | . | |
| . | | . | | . | |

FIG.13

FIG.15(B) AFTER CHANGE

| CONTRACTOR'S TELEPHONE NO. | CONTRACTOR'S NAME |
|---|---|
| 090-AAAA-CCCC | YAMADA HANAKO |
| TELEPHONE DIRECTORY INFORMATION | |
| TELEPHONE NUMBER | NAME |
| 090-YYYY-ZZZZ | SUZUKI TARO |
| 090-AAAA-DDDD | SAITO AKEMI |
| 090-BBBB-AAAA | SASAKI JIRO |
| . | |

| CONTRACTOR'S TELEPHONE NO. | CONTRACTOR'S NAME |
|---|---|
| 090-AAAA-DDDD | SAITO AKEMI |
| TELEPHONE DIRECTORY INFORMATION | |
| TELEPHONE NO. | NAME |
| 090-AAAA-CCCC | YAMADA HANAKO |
| 090-YYYY-ZZZZ | SUZUKI TARO |
| . | |

FIG.15(A) BEFORE CHANGE

| CONTRACTOR'S TELEPHONE NO. | CONTRACTOR'S NAME |
|---|---|
| 090-AAAA-CCCC | YAMADA HANAKO |
| TELEPHONE DIRECTORY INFORMATION | |
| NAME | NAME |
| 090-AAAA-BBBB | SUZUKI TARO |
| 090-AAAA-DDDD | SAITO AKEMI |
| 090-BBBB-AAAA | SASAKI JIRO |
| . | |

| CONTRACTOR'S TELEPHONE NO. | CONTRACTOR'S NAME |
|---|---|
| 090-AAAA-DDDD | SAITO AKEMI |
| TELEPHONE DIRECTORY INFORMATION | |
| TELEPHONE NO. | NAME |
| 090-AAAA-CCCC | YAMADA HANAKO |
| 090-AAAA-BBBB | SUZUKI TARO |
| . | |

TELEPHONE DIRECTORY INFORMATION MODIFYING APPARATUS

BACKGROUND OF THE INVENTION

(1) Field of the Invention

The present invention relates to a telephone directory information modifying apparatus, and more particularly, to a telephone directory information modifying apparatus capable of sending a notification to users of a data center where telephone directory information of portable telephones is managed and is also capable of rewriting the telephone directory information of such users when a portable telephone number has been changed.

(2) Description of the Related Art

Portable telephones have a telephone directory function, and the telephone directory provides the function of registering personal information, such as the names and telephone numbers of parties to be called, in built-in memory of portable telephones. Telephone directory information registered in the telephone directory permits the personal information to be searched to retrieve the telephone number of a person to be called and is used when making a telephone call.

A telephone number is occasionally changed as a measure to cope with social evils, such as nuisance telephone calls arising from stalking, for example. In general, when a person has changed his/her telephone number, he/she notifies all of those who are recorded in his/her telephone directory that the telephone number has been changed, and asks them to modify the telephone directory information of their portable telephones.

However, it is necessary that the notification of the telephone number change and the request for modification of the telephone directory information of the portable telephone should be made with respect to all persons registered in the telephone directory. Accordingly, if the number of registrants is large, tremendous efforts are required to have the registrants change the telephone number.

A technique of conveying telephone directory information to a called party is known from Unexamined Japanese Patent Publication No. 9-284379. With the technique disclosed in this publication, part or all of the telephone directory information of the calling party is transferred to the called party during a call, and the telephone directory information of the called party is automatically rewritten. Use of the technique permits the changed telephone number to be transferred to the called party, so that the telephone directory information of the called party can be directly modified. In this case, it is necessary that a telephone call be made to all parties who are registered in the telephone directory, in order to rewrite the telephone directory information of their portable telephones.

Meanwhile, there has been proposed a type of service whereby a backup of the telephone directory information of a portable telephone is held at a data center of a portable telephone service provider, so that in the event of failure or loss of the portable telephone, the backup telephone directory information can be readily registered in the repaired portable telephone or in a new one.

This service is, however, provided to individual users alone and does not permit exchange of telephone directory information between users. Thus, when notified of a change of a telephone number, the user must modify the telephone directory information for himself/herself.

SUMMARY OF THE INVENTION

The present invention was created in view of the above circumstances, and an object thereof is to provide a telephone directory information modifying apparatus which makes use of backup data, which is a backup of telephone directory information of portable telephones held at a data center, to permit mutual change of telephone number in telephone directories necessitated by a telephone number change.

To achieve the above object, there is provided a telephone directory information modifying apparatus for modifying telephone directory information held and managed at a data center. The telephone directory information modifying apparatus comprises telephone number changing means, responsive to a telephone number change notification instruction, for changing a telephone number of a number changer in telephone directory information of a registrant who has registered the telephone number of the number changer.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a chart showing, by way of example, contents of telephone directory information;

FIGS. 7(A) and 7(B) are charts showing registrant's telephone directory information, wherein FIG. 7(A) shows the information before change, and FIG. 7(B) shows the information after change;

FIGS. 8(A) and 8(B) are charts showing telephone directory information, wherein

FIG. 8(A) shows number changer's information, and

FIG. 8(B) shows registrant's information including no information about the number changer;

FIG. 13 is a chart showing stored telephone directory information of potential number-change recipients;

FIGS. 15(A) and 15(B) are charts showing telephone directory information of number-change recipients specified by the number changer, wherein FIG. 15(A) shows the information before change, and FIG. 15(B) shows the information after change.

DESCRIPTION OF THE PREFERRED EMBODIMENTS

First, the present invention will be outlined with reference to the drawings.

Figure 1:
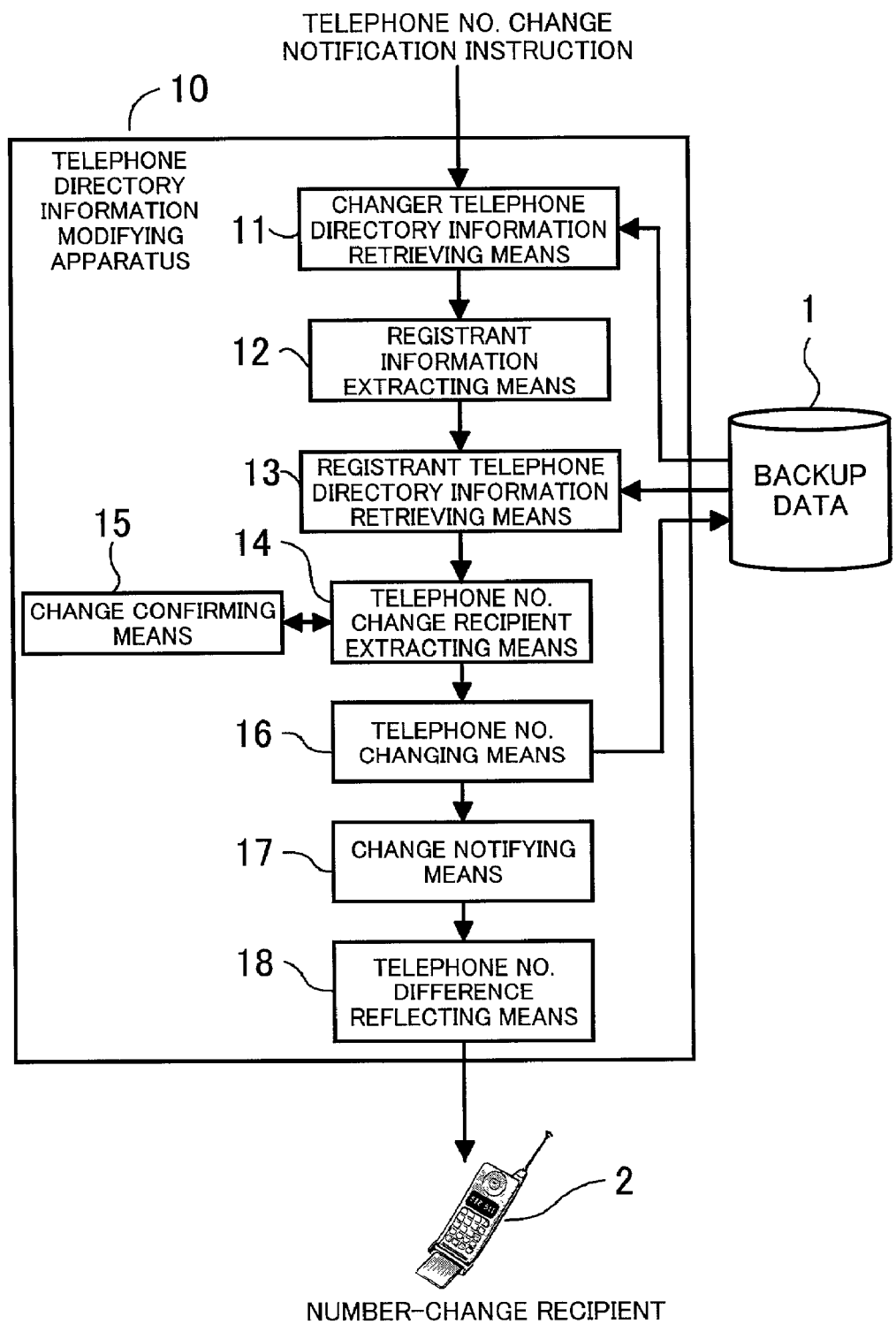
FIG. 1 is a diagram illustrating the principle of operation according to the present invention.

FIG. 1 illustrates the principle of operation according to the present invention.

A telephone directory information modifying apparatus 10 according to the present invention makes use of backup data 1, which is a backup of telephone directory information of individual users' portable telephones and held at a data center, in a manner such that when the telephone number of a certain user has been changed, a telephone number change notification is sent to registrants registered in the telephone directory of the portable telephone owned by the number-changing user (changer) or the changer's telephone number registered in the registrants' telephone directory information is changed.

The telephone directory information modifying apparatus 10 comprises changer telephone directory information retrieving means 11, registrant information extracting means 12, registrant telephone directory information retrieving means 13, telephone number change recipient extracting means 14, change confirming means 15, telephone number changing means 16, change notifying means 17, and telephone number difference reflecting means 18.

In response to a telephone number change notification instruction from a changer or from a portable telephone service provider, the changer telephone directory information retrieving means 11 searches the backup data 1 and acquires the changer's telephone directory information. The registrant information extracting means 12 extracts information about registrants registered in the telephone directory, from among the changer's telephone directory information acquired by the changer telephone directory information retrieving means 11. Based on the registrant information extracted by the registrant information extracting means 12, the registrant telephone directory information retrieving means 13 searches the backup data 1 and acquires registrants' telephone directory information. The telephone number change recipient extracting means 14 checks the registrants' telephone directory information acquired by the registrant telephone directory information retrieving means 13 to determine whether or not information about the changer is registered. If information about the changer is registered, corresponding registrant information is extracted as indicative of a telephone number change recipient. The change confirming means 15 requests the changer or each number-change recipient to confirm whether the recipient's telephone directory information needs to be modified or not. The telephone number changing means 16 modifies the backup data 1; more specifically, it modifies the telephone directory information of all number-change recipients or of only those recipients with respect to whom approval of the change has been confirmed by the change confirming means 15. The change notifying means 17 sends change notification mail to each number-change recipient whose telephone number information relating to the changer has been modified, and also sends change completion mail to the changer, if necessary. The telephone number difference reflecting means 18 causes a telephone number difference in the telephone directory information of each number-change recipient whose telephone number information relating to the changer has been modified, to be reflected in the telephone directory of the recipient's portable telephone 2.

In the above-described configuration, when the telephone directory information modifying apparatus 10 is supplied with a telephone number change notification instruction from a changer or the portable telephone service provider, first, the changer telephone directory information retrieving means 11 searches the backup data 1 by using the changer's telephone number as a key, to acquire the changer's telephone directory information. Subsequently, the registrant information extracting means 12 extracts information about registrants registered in the acquired telephone directory information, and the registrant telephone directory information retrieving means 13 searches the backup data 1 by using each registrant's telephone number as a key, to acquire the registrants' telephone directory information.

The telephone number change recipient extracting means 14 then determines whether or not information about the changer exists in each registrant's telephone directory information. If information about the changer exists, it is judged that the changer and the corresponding registrant are mutual acquaintances, and thus the registrant's telephone directory information is regarded as information to be modified.

At this stage, if necessary, the change confirming means 15 sends information about the registrants as potential number-change recipients to the changer to inquire whether the change is to be performed, and only those registrants approved by the changer are regarded as number-change recipients. Alternatively, the change confirming means inquires of each registrant as a potential number-change recipient whether his/her own registrant information may be modified, and only those registrants giving consent are regarded as number-change recipients.

The telephone number changing means 16 then changes the changer's telephone number in the telephone directory information of each registrant as the number-change recipient. Subsequently, change notification mail is sent to each number-change recipient with respect to whom the changer's telephone number has been changed, and if necessary, change completion mail is also sent to the changer. At the request of the number-change recipient, the telephone number difference reflecting means 18 transfers the telephone number difference in the recipient's telephone directory information to the recipient's portable telephone 2 to have the difference reflected in its telephone directory.

As described above, the telephone number is not rewritten unless the changer and a potential number-change recipient are mutually registered, whereby nuisance telephone calls etc. can be prevented.

Figure 2:
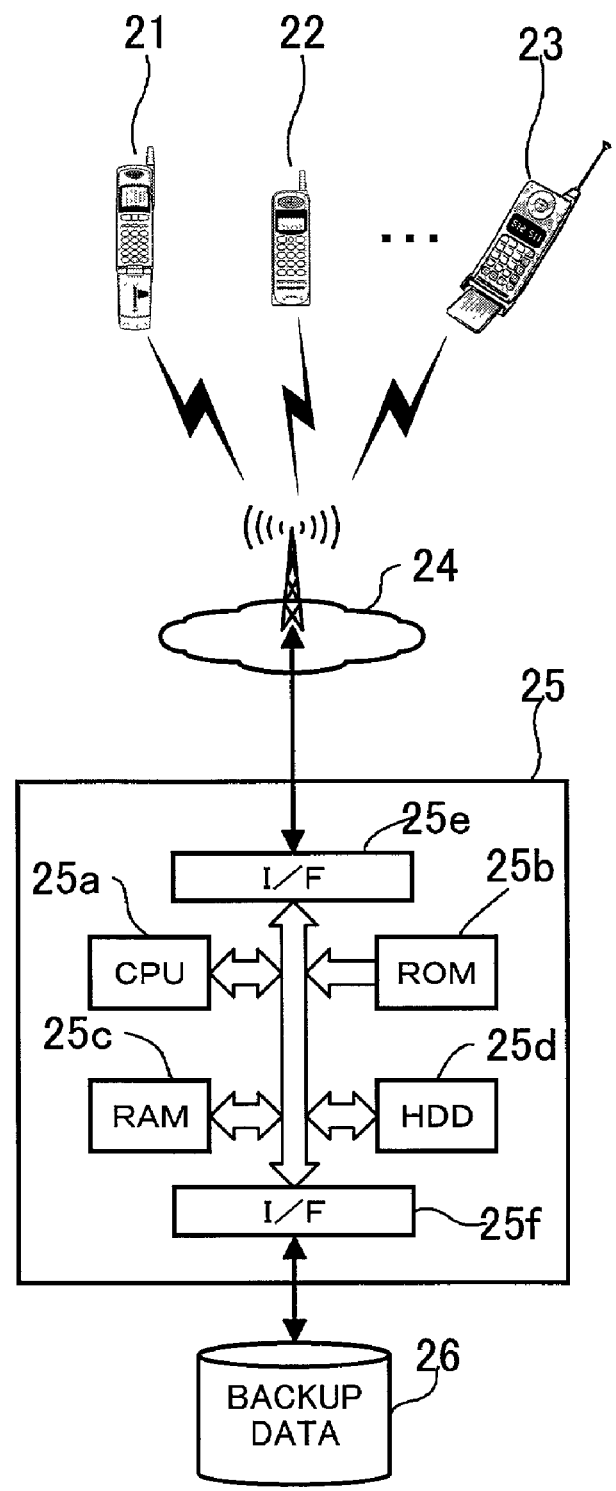
FIG. 2 is a diagram showing an exemplary configuration according to an embodiment of the present invention.

Referring now to FIG. 2, an exemplary configuration according to an embodiment of the present invention will be described.

FIG. 2 illustrates the configuration according to the embodiment of the invention.

As shown in the figure, the embodiment comprises, as its elements, portable telephones 21, 22, 23 owned by a plurality of users, a portable telephone network 24, a server 25, and backup data 26.

The server 25 comprises a computer, which includes a CPU (Central Processing Unit) 25$a$, a ROM (Read Only Memory) 25$b$, a RAM (Random Access Memory) 25$c$, an HDD (Hard Disk Drive) 25$d$, and I/Fs (Interfaces) 25$e$ and 25$f$.

The CPU 25$a$ controls the individual sections of the computer and also performs various operations in accordance with programs stored in the HDD 25$d$.

The ROM 25b stores basic programs executed by the CPU 25a as well as data.

The RAM 25c temporarily stores programs being executed by the CPU 25a and data derived in the middle of operations.

The HDD 25d stores programs to be executed by the CPU 25a as well as data to be processed. In this embodiment, the HDD 25d stores, for example, a telephone number change notification program.

The I/F 25e appropriately converts the form of representation of data when exchanging information with the portable telephones 21-23 through the portable telephone network 24.

The I/F 25f also appropriately converts the form of representation of data when exchanging information with the backup data 26.

The backup data 26 is a backup of telephone directory information owned by the individual portable telephones 21-23 and is managed at a data center. The backup data 26 may of course be directly managed by the server 25.

Operation of the embodiment configured as above will be now described.

Let it be assumed that the owners of the portable telephones 21-23, for example, are mutual acquaintances, that their telephone numbers are registered in one another's telephone directories, and that their telephone directory information is backed up as the backup data 26.

Also, let it be assumed that the user of the portable telephone 21, for example, has changed his/her telephone number, and that this change of the telephone number is notified to the other users to change the changer's telephone number registered in the telephone directories of the other users' portable telephones 22, 23.

First, using the portable telephone 21, the changer selects a telephone number change notification function. In the server 25, the CPU 25a executes the telephone number change notification program, whereupon the telephone directory information of the portable telephones 22, 23 is retrieved from the backup data 26 and the registered telephone number of the portable telephone 21 is replaced with the new telephone number. Prior to rewriting the telephone number, an inquiry as to whether the telephone number needs to be changed or not may be sent to the user who has changed his/her telephone number or to the other users, thus allowing the number-changing user or the other users to make a final decision whether to change the telephone number. Subsequently, mail notifying that the telephone number of the portable telephone 21 has been changed is sent to the portable telephones 22, 23. Also, the consequent telephone number difference in the telephone directory information of the portable telephones 22, 23, stored as the backup data 26, may be transferred to the portable telephones 22, 23 so that the difference may be reflected in their telephone directories.

A specific process flow according to the telephone number change notification program will be now described in detail.

To make use of the telephone number change notification function, individual users make in advance a backup contract with the data center, and thus their telephone directory information is kept as the backup data 26. As the telephone directory information, the telephone number and name of the user (SUZUKI Taro) and the telephone numbers and names of a plurality of registrants are recorded, as shown in FIG. 3.

Let it be assumed that the telephone number of the user (SUZUKI Taro) has been changed from "090-AAAA-BBBB" to "090-YYYY-ZZZZ", for example, and that using the telephone number change notification function selectable from a service menu of the portable telephone, the user sends a notification of the telephone number change. A screen image displayed in this case is shown in FIGS. 4 and 5.

Figure 4:
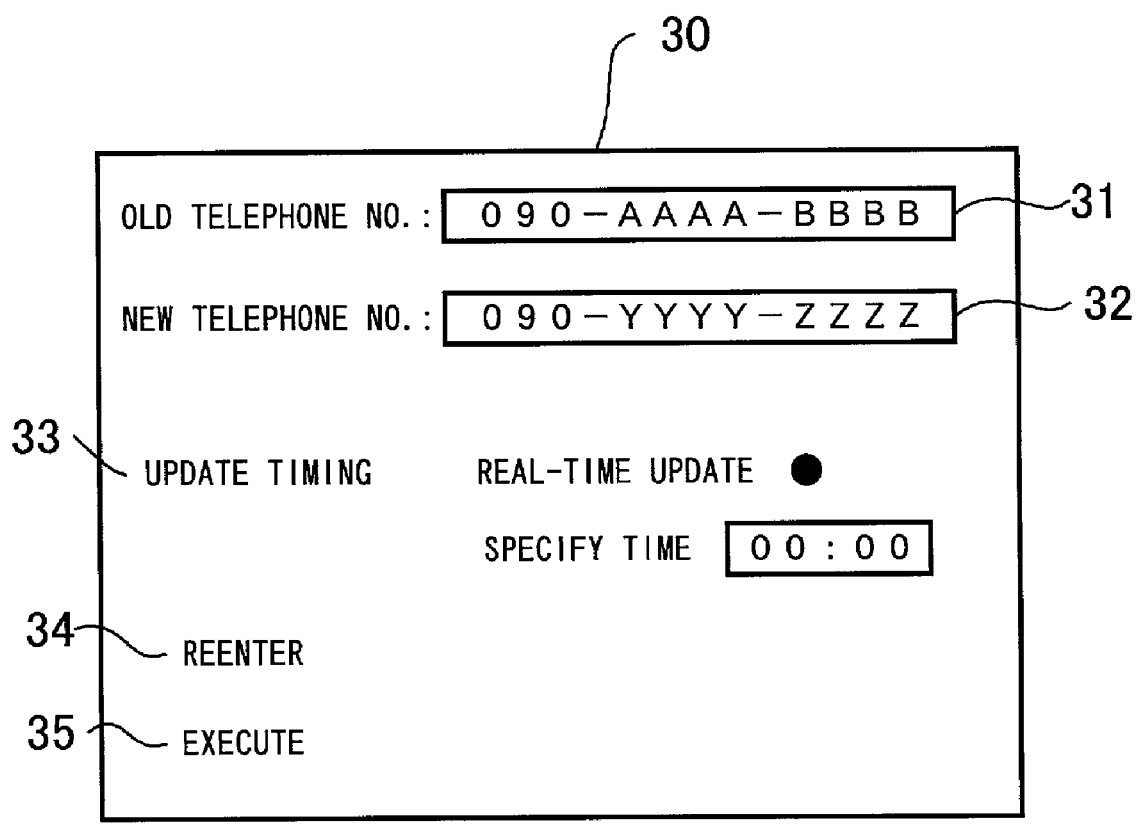
FIG. 4 is a diagram showing an exemplary screen image of a telephone number change notification function wherein update timing is set to real-time update.
Figure 5:
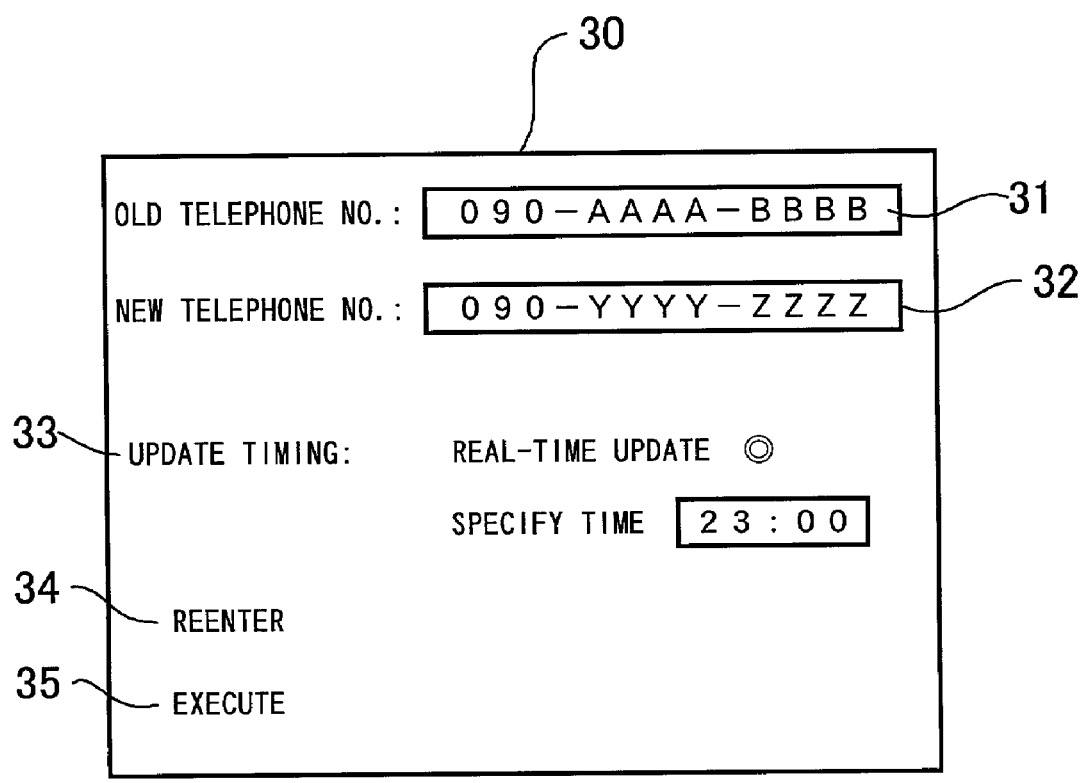
FIG. 5 is a diagram showing an exemplary screen image of the telephone number change notification function wherein the update timing is set to specified time.

FIG. 4 shows an exemplary screen image of the telephone number change notification function wherein update timing is set to real-time update, and FIG. 5 shows an exemplary screen image of the telephone number change notification function wherein the update timing is set to specified time. A screen 30 of the telephone number change notification function includes an old telephone number entry field 31, a new telephone number entry field 32, an update timing specification field 33, a reenter button 34, and an execute button 35. The old telephone number is input in the old telephone number entry field 31, the new telephone number is input in the new telephone number entry field 32, and with the update timing specified, the execute button 35 is pressed, whereupon the telephone number change notification function is started. Where real-time update is specified as the update timing as shown in FIG. 4, the telephone directory information of registrants registered in the telephone directory can be updated in real time, and where a specific time is set for the update timing as shown in FIG. 5, the telephone directory information can be updated at the specified time.

In the following description, to discriminate portable telephone users from one another, the user whose telephone number has been changed is sometimes called the changer, and those who are registered in the telephone directory are called registrants or number-change recipients.

Figure 6:
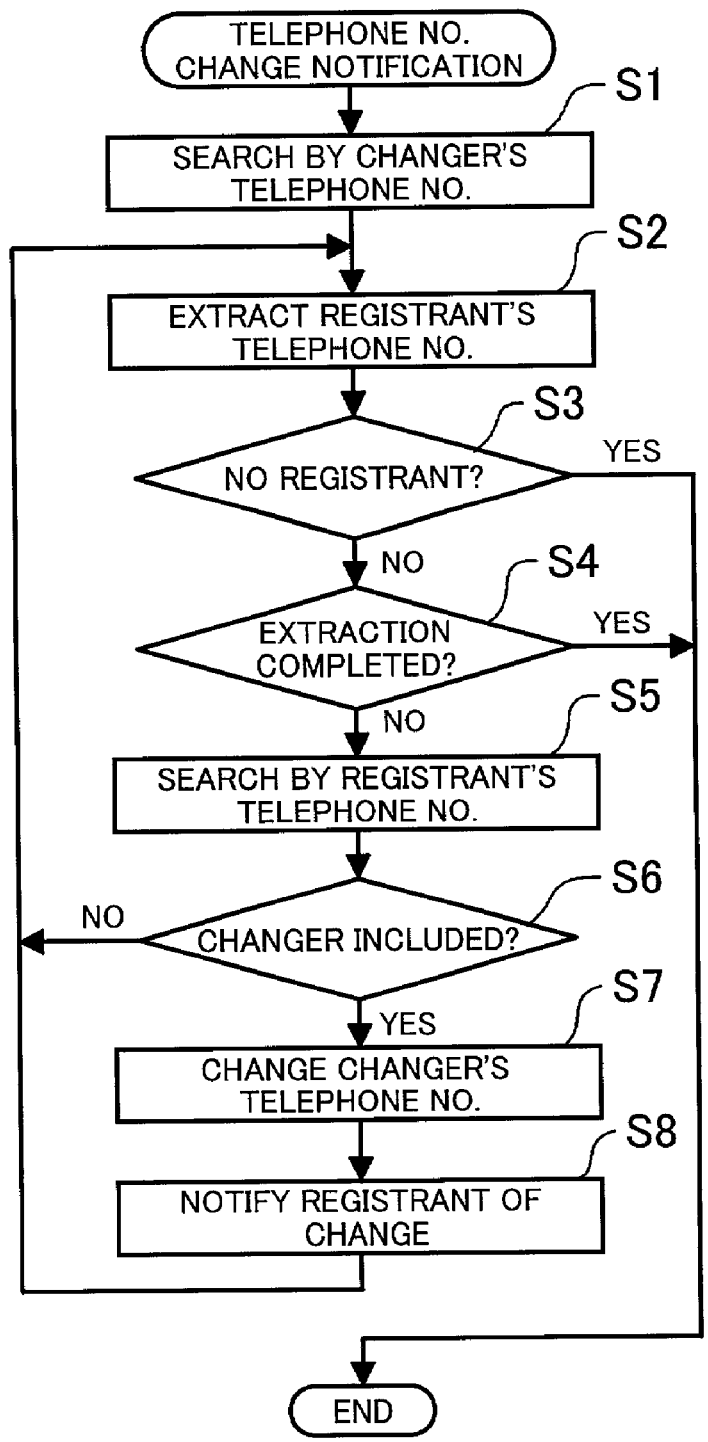
FIG. 6 is a flowchart illustrating a first process flow relating to telephone number change notification.

FIG. 6 is a flowchart illustrating a first process flow relating to the telephone number change notification.

Assuming that the changer (SUZUKI Taro) selects the telephone number change notification function and, with real-time update specified, sends a notification of the old and new telephone numbers, the server 25 searches the backup data 26 by the old telephone number to acquire the changer's telephone directory information (see FIG. 3) (Step S1). At this time, the telephone number in the changer's telephone directory information may be replaced with the new telephone number.

Subsequently, the registrants' telephone numbers are extracted, one by one, from the telephone directory information (Step S2). If there is no registrant or there is no remaining registrant to be extracted, this process is ended (Steps S3, S4).

Then, using the registrant's telephone number thus extracted, the backup data 26 is searched to acquire the registrant's telephone directory information (Step S5). It is determined whether or not the changer is included in the acquired telephone directory information (Step S6); if the changer is not included, the flow returns to Step S2 and the telephone number of the next registrant is extracted. On the other hand, if the changer is included in the registrant's telephone directory information, it is judged that the changer and the registrant are acquainted with each other, and thus the changer's telephone number in the registrant's telephone directory information is replaced with the new telephone number (Step S7). Mail is then sent to the registrant to notify him/her that the changer's telephone number has been changed (Step S8), whereupon the flow returns to Step S2 to extract the telephone number of the next registrant. In cases where a specific time has been set for the update timing, the changer's telephone number is replaced with the new one at the specified time.

The above process flow after the acquisition of the changer's telephone directory information will be now described with reference to FIG. 3 showing the changer's telephone directory information. In the telephone directory information of the changer "SUZUKI Taro", "YAMADA Hanako" is registered as the first entry. The telephone directory information of the registrant "YAMADA Hanako", which is retrieved upon extraction of the first data entry, has contents as shown in FIG. 7(A), for example. This telephone directory information has the changer "SUZUKI Taro" registered therein, and accordingly, the telephone number of "SUZUKI Taro" registered in the telephone directory information of "YAMADA Hanako" is replaced with the new telephone number, as shown in FIG. 7(B). Subsequently, mail to the effect that "the telephone number of SUZUKI Taro has been changed" is sent to "YAMADA Hanako".

On the other hand, in the case where "SASAKI Jiro" is included in the telephone directory information of the changer "SUZUKI Taro", as shown in FIG. 8(A), but "SUZUKI Taro" is not included in the telephone directory information of "SASAKI Jiro", as shown in FIG. 8(B), it is judged in Step S6 in FIG. 6 that the changer is not included in the registrant's telephone directory information. Since data to be modified itself does not exist in the registrant's telephone directory information, the registrant's telephone directory information is left unmodified. Also, the notification of the telephone number change is not sent to the registrant "SASAKI Jiro".

Figure 9:
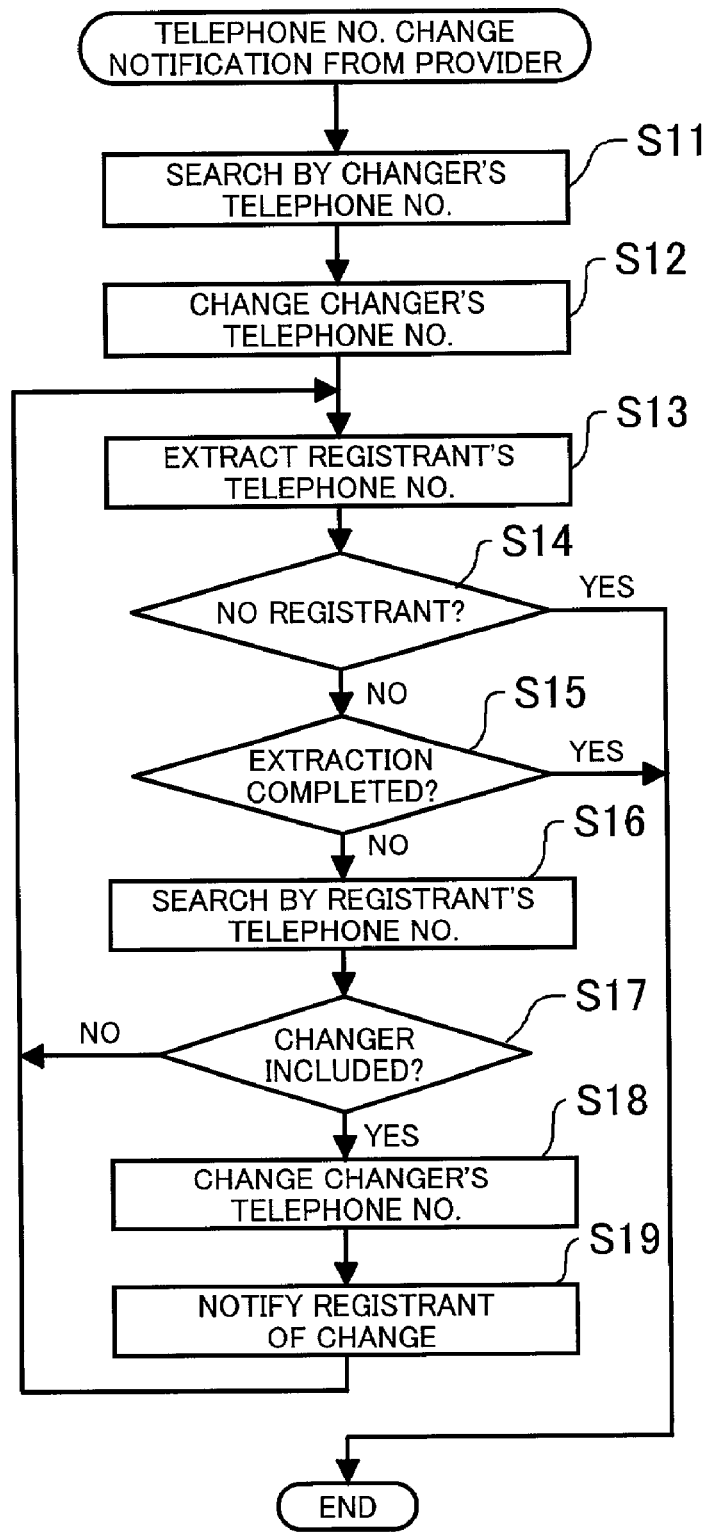
FIG. 9 is a flowchart illustrating a second process flow relating to telephone number change notification.

FIG. 9 is a flowchart illustrating a second process flow relating to the telephone number change notification.

In this example, the change of a user's telephone number is notified from the portable telephone service provider. First, on receiving a user's telephone number change notification from the provider, the server 25 searches the backup data 26 by the old telephone number to acquire the changer's telephone directory information (Step S11), and replaces the changer's telephone number with the new telephone number (Step S12).

Subsequently, the registrants' telephone numbers are extracted one by one from the telephone directory information (Step S13). If there is no registrant or if there is no remaining registrant to be extracted, this process is ended (Steps S14, S15).

Then, using the extracted registrant's telephone number, the backup data 26 is searched to acquire the registrant's telephone directory information (Step S16). It is determined whether or not the changer is included in the acquired telephone directory information (Step S17); if the changer is not included, the flow returns to Step S13 and the telephone number of the next registrant is extracted. On the other hand, if the changer is included in the registrant's telephone directory information, the changer's telephone number in the registrant's telephone directory information is replaced with the new telephone number (Step S18), and the registrant is notified by mail that the changer's telephone number has been changed (Step S19). Subsequently, the flow returns to Step S13 to extract the telephone number of the next registrant.

Figure 10:
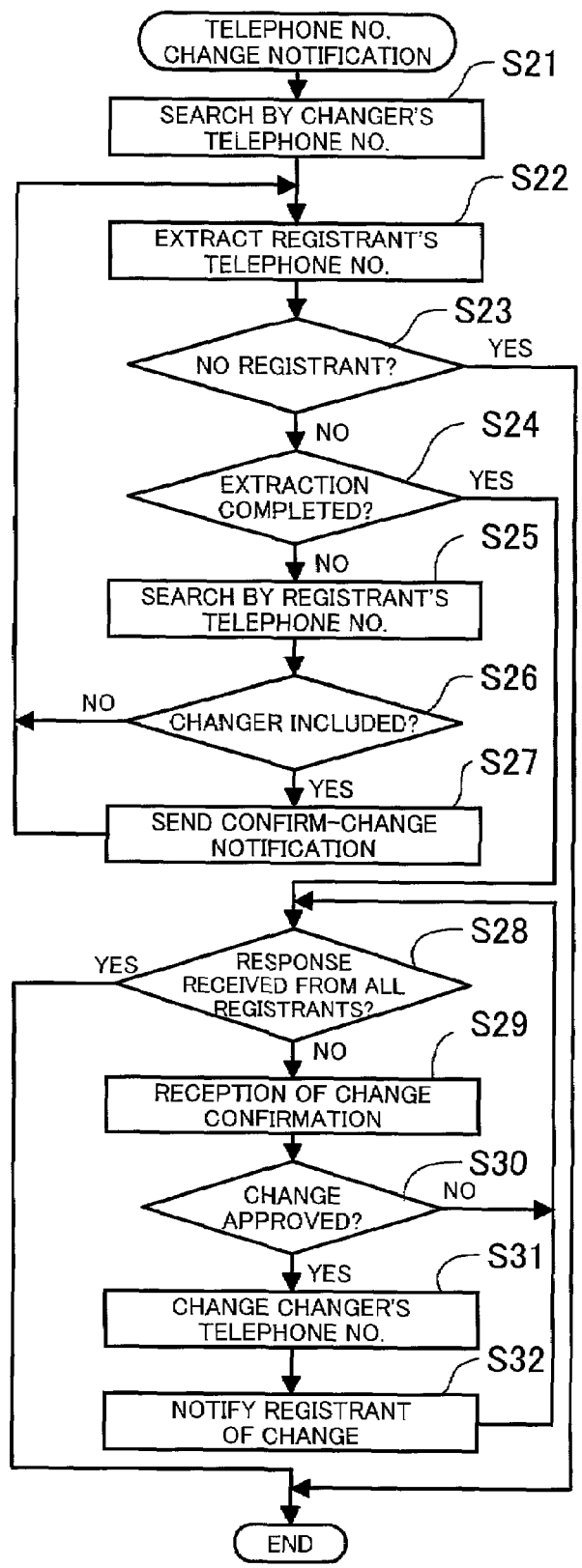
FIG. 10 is a flowchart illustrating a third process flow relating to telephone number change notification.

FIG. 10 is a flowchart illustrating a third process flow relating to the telephone number change notification.

After selecting the telephone number change notification function, the changer sends a notification of the old and new telephone numbers, whereupon the server 25 searches the backup data 26 by the old telephone number to acquire the changer's telephone directory information (Step S21). At this time, the changer's telephone number in the telephone directory information may be replaced with the new telephone number.

Subsequently, the registrants' telephone numbers are extracted one by one from the changer's telephone directory information (Step S22). It is determined whether or not there exists any registrant (Step S23); if there is no registrant, this process is ended. It is then determined whether or not all registrants have been extracted (Step S24). If there remains an extracted registrant, the backup data 26 is searched by the extracted registrant's telephone number, to acquire the registrant's telephone directory information (Step S25). It is then determined whether or not the changer is included in the acquired telephone directory information (Step S26). If the changer is not included, the flow returns to Step S22 and the telephone number of the next registrant is extracted; if the changer is included in the registrant's telephone directory information, a confirm-change notification is sent to the registrant (Step S27), and the flow returns to Step S22.

Figure 11:
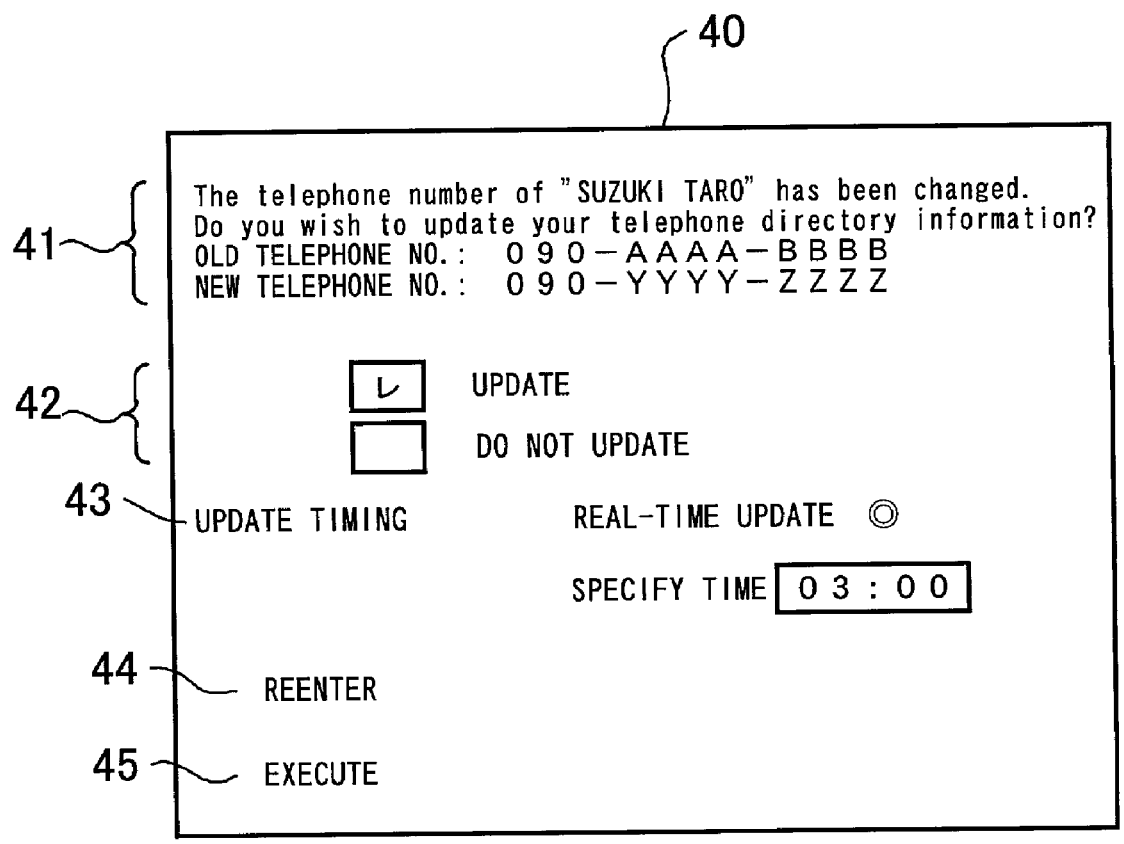
FIG. 11 is a diagram showing an exemplary screen displayed on a portable telephone of a number-change recipient who has received a confirm-change notification.

The confirm-change notification is received by the user, whereupon a screen as shown in FIG. 11 is displayed at the user's portable telephone. A confirm-change notification screen 40 includes a message 41 notifying the change of the changer's telephone number, check boxes 42 allowing the user to specify whether to modify the telephone directory information to reflect the new telephone number, an update timing specification field 43, a reenter button 44, and an execute button 45. Whether to update the telephone directory information to reflect the new telephone number is specified and the execute button 35 is pressed, whereupon the registrant's confirmed intention as to the change is sent back.

After completing the extraction of all registrants, acquisition of the registrants' telephone directory information, changer registration check, and transmission of the confirm-change notification as described above, the process waits for reception of the change confirmation from the registrants to whom the notification has been sent.

First, it is determined whether or not response has been received from all registrants to whom the notification has been sent (Step S28); if response has been received from all registrants, the process is ended. When a change confirmation is received from a registrant to whom the notification has been sent (Step S29), it is determined whether or not the change has been approved (Step S30). If the change is not approved, the flow returns to Step S28 and waits for reception of the next change confirmation. On the other hand, if the change is approved, the changer's telephone number in the registrant's telephone directory information is replaced with the new telephone number (Step S31), and the registrant is notified by mail that the changer's telephone number has been changed (Step S32). The flow then returns to Step S28 and waits for reception of a change confirmation from a registrant to whom the notification has been sent. In cases where a specific time has been set for the update timing, the changer's telephone number is replaced with the new one at the specified time.

Figure 12:
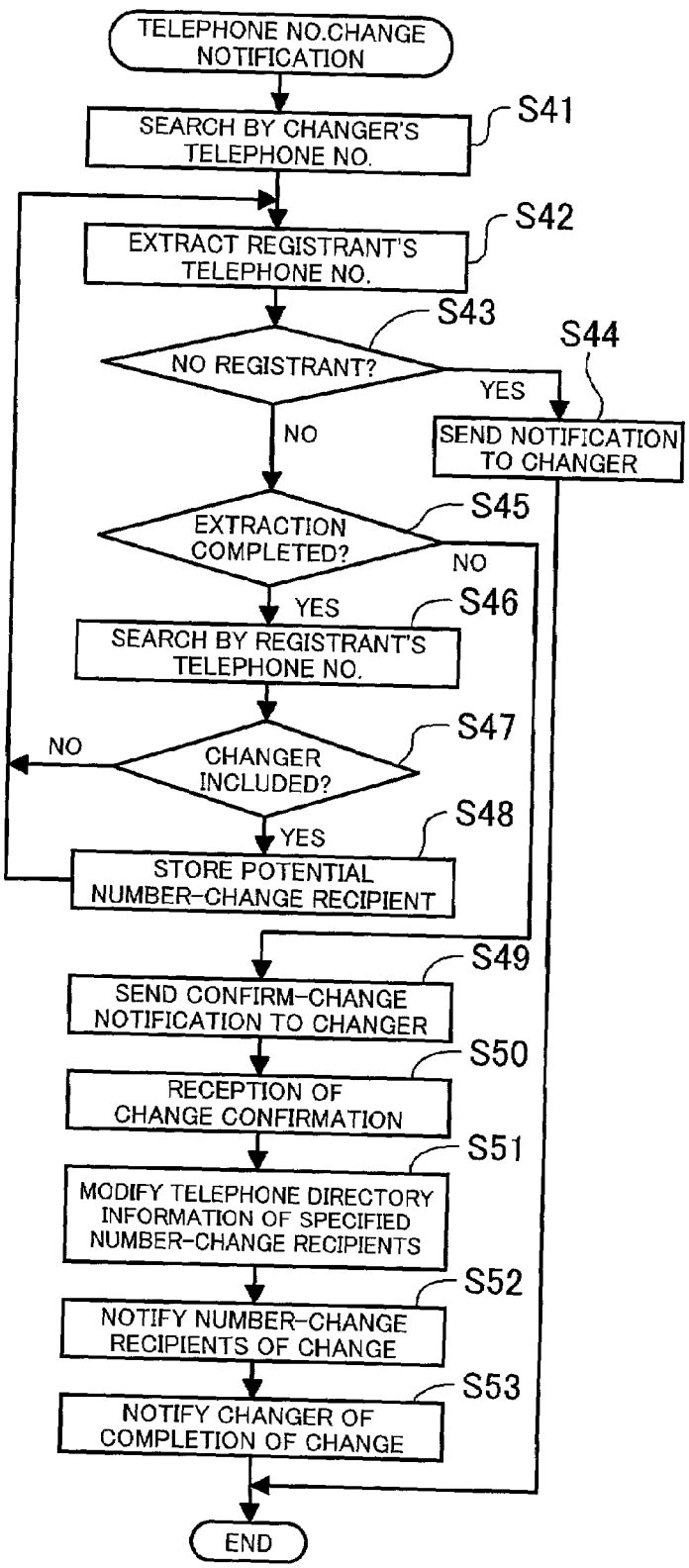
FIG. 12 is a flowchart illustrating a fourth process flow relating to telephone number change notification.

FIG. 12 is a flowchart illustrating a fourth process flow relating to the telephone number change notification.

After selecting the telephone number change notification function, the changer sends a notification of the old and new telephone numbers with real-time update specified, whereupon the server 25 searches the backup data 26 by the old telephone number to acquire the changer's telephone directory information (Step S41). At this time, the changer's telephone number in the telephone directory information may be replaced with the new telephone number.

Subsequently, the registrants' telephone numbers are extracted one by one from the changer's telephone directory information (Step S42). It is determined whether or not there exists any registrant (Step S43); if there is no registrant, a notification to that effect is sent to the changer (Step S44) and the process is ended. It is then determined whether or not all registrants have been extracted (Step S45). If there remains an extracted registrant, the backup data 26 is searched by using the extracted registrant's telephone number, to acquire the registrant's telephone directory information (Step S46). It is then determined whether or not the changer is included in the acquired telephone directory information (Step S47). If the changer is not included, the flow returns to Step S42 and the telephone number of the next registrant is extracted; if the changer is included in the registrant's telephone directory information, the registrant is stored as a potential number-change recipient (Step S48), and the flow returns to Step S42. Data thus stored may include three potential number-change recipients, for example, as shown in FIG. 13. As seen from the illustrated data, the changer "SUZUKI Taro" is included in all three of registrants' telephone directory information.

After completing the extraction of all registrants, acquisition of the registrants' telephone directory information and changer registration check, a confirm-change notification is sent to the changer (Step S49).

Figure 14:
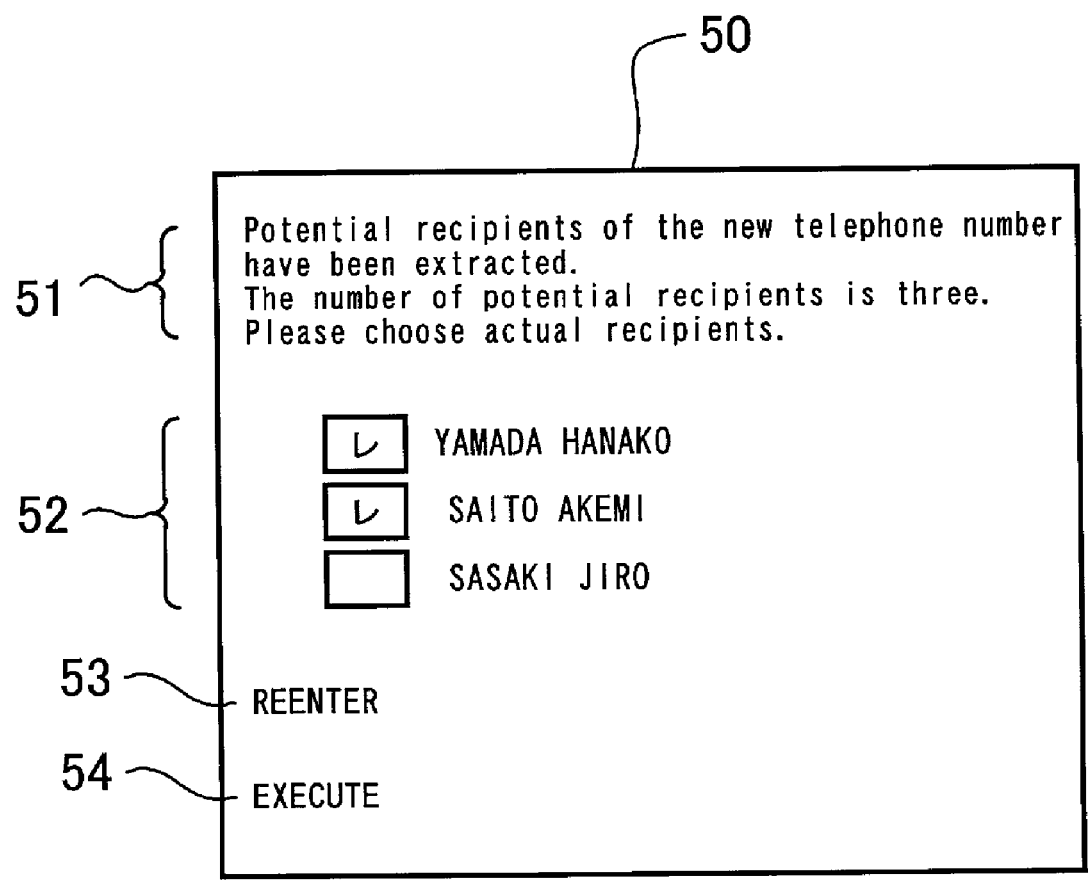
FIG. 14 is a diagram showing an exemplary screen of a confirm-change notification received by a number changer.

The confirm-change notification is received by the changer, whereupon a screen as shown in FIG. 14 is displayed at the changer's portable telephone. A confirm-change notification screen 50 includes a message 51 requesting the selection of update recipients, check boxes 52 arranged next to a list of potential update recipients and allowing the changer to specify the update recipients, a reenter button 53, and an execute button 54. The changer checks, among the listed registrants, those whom he wishes to have his telephone number changed and then presses the execute button 54, whereupon the changer's confirmed intention as to the change is sent back. In the illustrated example, although the number of potential update recipients is three, the changer has selected two persons, that is, "YAMADA Hanako" and "SAITO Akemi", as the update recipients whom he wishes to have his telephone number changed.

On receipt of the change confirmation from the changer (Step S50), the changer's telephone number in the telephone directory information of the number-change recipients specified by the changer is replaced with the new telephone number (Step S51). Then, each registrant is notified by mail that the changer's telephone number has been changed (Step S52), and the changer is notified of completion of the change (Step S53). In cases where the changer has previously set a specific time for the update timing, the changer's telephone number is replaced with the new one at the specified time.

In the telephone number rewriting process described above, the number of number-change recipients specified by the changer is two, as shown in FIG. 15(A), and as a result of the rewriting, the telephone number of the changer "SUZUKI Taro" is changed to the new telephone number, as shown in FIG. 15(B).

Figure 16:
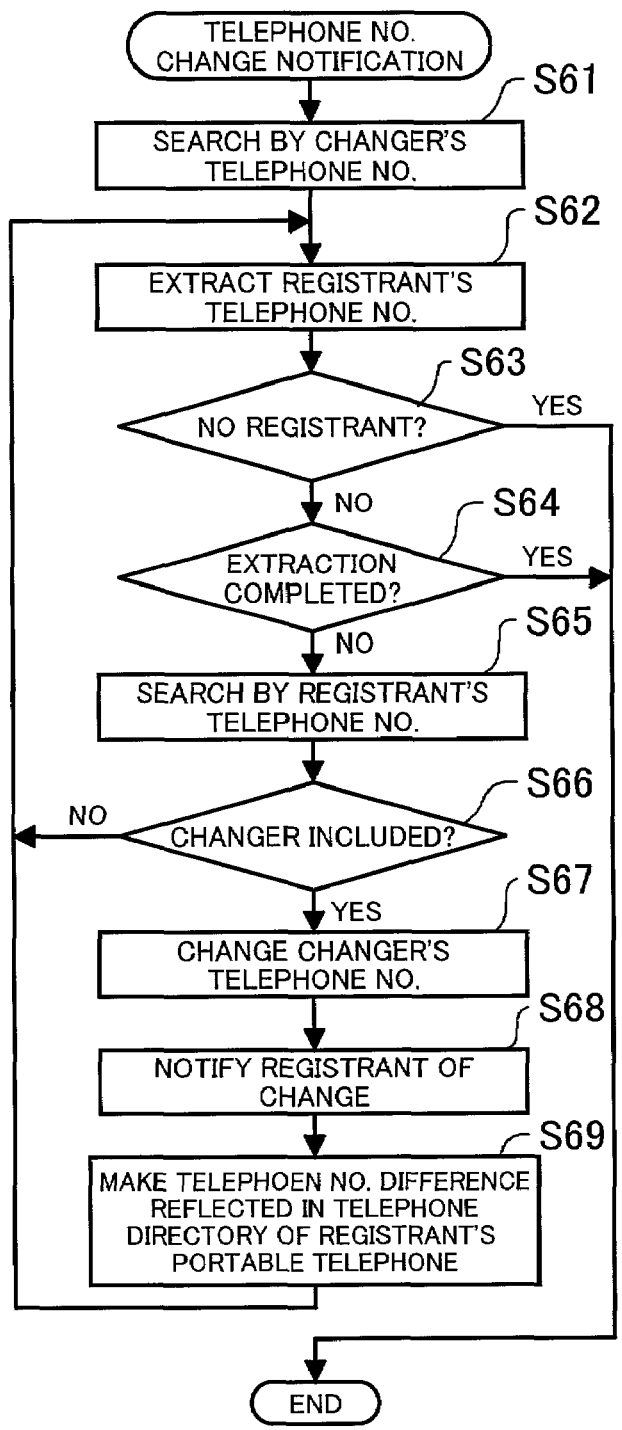
FIG. 16 is a flowchart illustrating a fifth process flow relating to telephone number change notification.

FIG. 16 is a flowchart illustrating a fifth process flow relating to the telephone number change notification.

After selecting the telephone number change notification function, the changer sends a notification of the old and new telephone numbers with real-time update specified, whereupon the server 25 searches the backup data 26 by the old telephone number to acquire the changer's telephone directory information (Step S61). At this time, the changer's telephone number in the telephone directory information may be replaced with the new telephone number.

Subsequently, the registrants' telephone numbers are extracted one by one from the telephone directory information (Step S62). If there is no registrant or there is no remaining registrant to be extracted, this process is ended (Steps S63, S64).

Then, using the extracted registrant's telephone number, the backup data 26 is searched to acquire the registrant's telephone directory information (Step S65). It is then determined whether or not the changer is included in the acquired telephone directory information (Step S66); if the changer is not included, the flow returns to Step S62 and the telephone number of the next registrant is extracted. On the other hand, if the changer is included in the registrant's telephone directory information, the changer's telephone number in the registrant's telephone directory information is replaced with the new telephone number (Step S67), and the corresponding number-change recipient is notified by mail that the changer's telephone number has been changed (Step S68). Further, a telephone number difference is extracted form the backup data 26 and is transferred to the portable telephone of the number-change recipient to be reflected in the telephone directory thereof (Step S69). Subsequently, the flow returns to Step S62 to extract the telephone number of the next registrant. Thus, the telephone directories of number-change recipients are automatically rewritten, so that the number-change recipients can be saved from receiving the changer's telephone number change notification and modifying their own telephone directories.

The contents of the above-described processing functions to be accomplished by the server may be described in a program recorded in a computer-readable recording medium. By executing the program by a computer, it is possible to perform the above-described processes. The computer-readable recording medium includes magnetic recording device, semiconductor memory and the like. To distribute the program to the market, the program may be stored in portable recording media such as CD-ROM (Compact Disk Read Only Memory) or floppy disk. Alternatively, the program may be stored in a storage device of a computer connected to a network and may be transferred to other computers through the network. To execute the program by a computer, the program stored in a hard disk unit or the like of the computer is loaded into the main memory and executed.

As described above, the present invention makes use of backup data of telephone directory information of portable telephones, and only if a match is found between the information registered in the telephone directory information of a telephone number changer and that registered in registrant's telephone directory information, the registrant's telephone directory information is rewritten and the registrant is notified of the change. Consequently, only when the changer and a registrant are mutual acquaintances, the registrant's telephone directory information is automatically modified. Thus, in cases where a person troubled with nuisance telephone calls from a stranger has changed his/her telephone number, the stranger's telephone number is not extracted in the stage of extraction of the registrant information since the troubled person will never register such a stranger's telephone number in his/her telephone directory, and therefore, the changed telephone number never becomes known to the stranger.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus disposed in a data center managing a telephone network, the apparatus comprising:
    a storage unit storing a first backup copy of telephone directory information received from a first subscriber identified by a first telephone number, as well as a second backup copy of telephone directory information received from a second subscriber identified by a second telephone number;
    a first searching unit, responsive to a telephone number change notification instruction requesting a change of the first telephone number to a third telephone number, searching the first backup copy to find that the second telephone number is registered therein;
    a second searching unit, responsive to detection of the second telephone number in the first backup copy, searching the second backup copy to determine whether the first telephone number is registered therein; and
    a telephone number changing unit, responsive to detection of the first telephone number in the second backup copy, changing the first telephone number in the second backup copy to the third telephone number.

2. The telephone directory information modifying apparatus according to claim 1, further comprising a change notifying unit notifying the second subscriber of the change of the first telephone number.

3. The telephone directory information modifying apparatus according to claim 1, further comprising a change confirming unit that asks the first subscriber whether or not the second backup copy needs to be modified, before the telephone number changing unit changes the first telephone number in the second backup copy.

4. The telephone directory information modifying apparatus according to claim 1, wherein said telephone number change notification instruction is an instruction from the first subscriber.

5. The telephone directory information modifying apparatus according to claim 1, wherein said telephone number change notification instruction is an instruction from a portable telephone service provider.

6. The telephone directory information modifying apparatus according to claim 5, the telephone number changing unit further changes the first telephone number in the first backup copy to the third telephone number in response to the telephone number change notification instruction from the portable telephone service provider.

7. The telephone directory information modifying apparatus according to claim 1, further comprising a telephone number difference reflecting unit sending telephone number difference information to the second subscriber so as to cause the change of the first telephone number, to be reflected in a telephone directory of the second subscriber's portable telephone.

8. A method implemented in a data center managing a telephone network, comprising:
    storing a first backup copy of telephone directory information received from a first subscriber identified by a first telephone number, as well as a second backup copy of telephone directory information received from a second subscriber identified by a second telephone number;
    responsive to a telephone number change notification instruction requesting a change of the first telephone number to a third telephone number, searching the first backup copy to find that the second telephone number is registered therein;
    responsive to detection of the second telephone number in the first backup copy, searching the second backup copy to determine whether the first telephone number is registered therein; and
    responsive to detection of the first telephone number in the second backup copy, changing the first telephone number in the second backup copy to the third telephone number.

9. A computer-readable storage medium storing a program for execution on a computer disposed in a data center managing a telephone network, the program causing the computer to function as:
    a storage unit storing a first backup copy of telephone directory information received from a first subscriber identified by a first telephone number, as well as a second backup copy of telephone directory information received from a second subscriber identified by a second telephone number;
    a first searching unit, responsive to a telephone number change notification instruction requesting a change of the first telephone number to a third telephone number, searching the first backup copy to find that the second telephone number is registered therein;
    a second searching unit, responsive to detection of the second telephone number in the first backup copy, searching the second backup copy to determine whether the first telephone number is registered therein; and
    a telephone number changing unit, responsive to detection of the first telephone number in the second backup copy, changing the first telephone number in the second backup copy to the third telephone number.

* * * * *